(12) United States Patent
Chen et al.

(10) Patent No.: US 9,086,276 B2
(45) Date of Patent: Jul. 21, 2015

(54) MULTILAYERED LIQUID CAPACITIVE MICRO INCLINOMETER

(71) Applicant: Sagatek Co., Ltd., Taipei (TW)

(72) Inventors: Jung-Hsiang Chen, Taipei (TW); Cheng-Szu Chen, Taipei (TW); Bo-Ting Chen, Taipei (TW)

(73) Assignee: SAGATEK CO., LTD., Taipei (TW)

( * ) Notice: Subject to any disclaimer, the term of this patent is extended or adjusted under 35 U.S.C. 154(b) by 169 days.

(21) Appl. No.: 14/039,018

(22) Filed: Sep. 27, 2013

(65) Prior Publication Data

US 2014/0082954 A1    Mar. 27, 2014

(30) Foreign Application Priority Data

Sep. 27, 2012   (TW) .............................. 101135545 A

(51) Int. Cl.
    *G01C 9/06* (2006.01)
    *G01C 9/20* (2006.01)

(52) U.S. Cl.
    CPC ........................................ *G01C 9/20* (2013.01)

(58) Field of Classification Search
    CPC .............................. G01C 9/20; G01C 2009/062
    USPC .............................. 33/366.11, 366.19, 366.25
    See application file for complete search history.

(56) References Cited

U.S. PATENT DOCUMENTS

| 5,083,383 | A * | 1/1992 | Heger ......................... 33/366.19 |
| 6,311,406 | B1 * | 11/2001 | Yashiro et al. ............. 33/366.19 |
| 6,449,857 | B1 * | 9/2002 | Anikolenko ................ 33/366.11 |
| 2001/0045019 | A1 * | 11/2001 | Takeuchi et al. ........... 33/366.19 |
| 2003/0167850 | A1 * | 9/2003 | Ishiguro et al. .................. 73/718 |
| 2003/0169057 | A1 * | 9/2003 | Ishiguro et al. ............... 324/661 |
| 2005/0144794 | A1 * | 7/2005 | Ueno et al. ................. 33/366.19 |
| 2012/0266470 | A1 * | 10/2012 | Ekchian .......................... 33/377 |
| 2014/0053421 | A1 * | 2/2014 | Fan et al. ................... 33/366.16 |

* cited by examiner

*Primary Examiner* — G. Bradley Bennett
(74) *Attorney, Agent, or Firm* — Bacon & Thomas, PLLC

(57) ABSTRACT

The present invention relates to a liquid multilayer capacitive micro inclinometer, comprising at least two pairs of differential electrodes, each pair positioned in a same plane; at least one common electrode with a portion positioned in the plane of each pair of differential electrodes. The differential electrodes and the common electrode are provided in a sealed chamber, in which an immersing liquid is filled. The shape of the differential electrodes forms a sector of a circular plane. The inclinometer may further integrate a reading circuit. The present invention also discloses preparation method for the invented inclinometer.

31 Claims, 5 Drawing Sheets

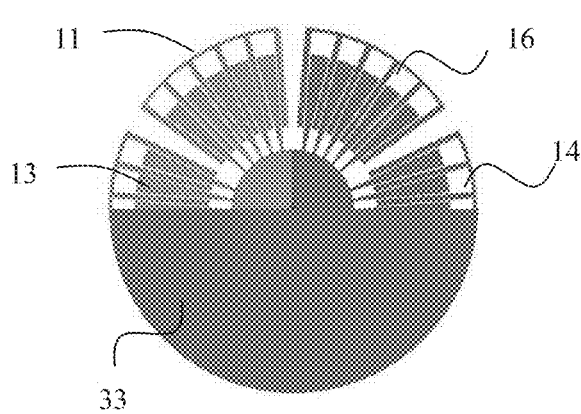
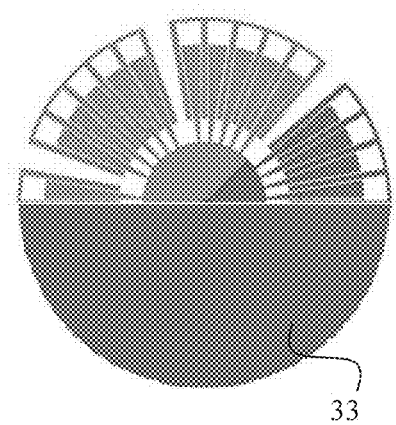
Fig. 4a                    Fig. 4b
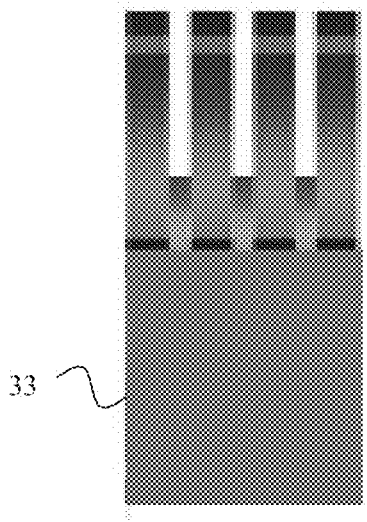
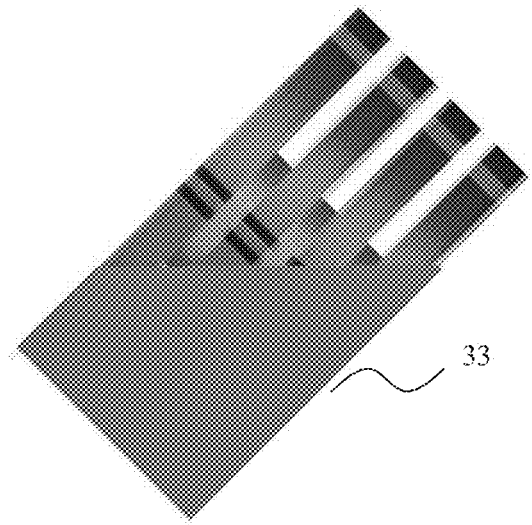
Fig. 5a                    Fig. 5b

MULTILAYERED LIQUID CAPACITIVE MICRO INCLINOMETER

FIELD OF THE INVENTION

The present invention relates to a micro inclinometer, especially to a multilayered liquid capacitive micro inclinometer.

BACKGROUND OF THE INVENTION

The inclinometer (tilt meter) has a wide range of applications, such as position determination in construction engineering, level measurement for mechanical platforms, monitoring of balancing system for automotive and aircrafts, monitoring in inclination and deformation of bridges and railroads, generating auxiliary horizontal lines for viewfinders of camera, tilt control and applications of handsets etc. It is also useful in the technical fields of semiconductor, chemical and biomedical engineering. The conventional micro inclinometer is divided into three types, according to their method of detection. They are: The mechanical inclinometer, the gas inclinometer and the liquid capacitive inclinometer.

The mechanical inclinometer comprises a mass block. The mass has two electrodes at its two ends, which interact with two corresponding fixed electrodes under the influence of the gravity force, when the inclinometer tilts. The capacitance generated by each pair of the fixed electrode and the mass electrode varies in response to the tilt angle of the inclinometer and is used to measure the tile angle of the inclinometer. The mechanical inclinometer is easy to fabricate but the spring that supports the mass block is fragile and tends to break when external forces are applied.

The gas inclinometer provides a sealed chamber, in which reference gas is enclosed. Heaters are used to heat the reference gas, whereby when the inclinometer tilts, the thermal convection in the sealed chamber varies. Variations in resistance at the thermistors adjacent to the heaters are used to calculate the tilt angle of the inclinometer. The gas inclinometer has a relatively simple structure and the reliability is not easily impacted by the dimensional variation of the microstructure. It, however, has drawbacks in that an additional sealing process of the chamber is required and that its reaction speed is relatively slow.

The conventional liquid capacitive micro inclinometer has a sealed chamber, in which electrolyte liquid is filled. The electrolyte liquid is conductive. Two electrodes partially immersed in the electrolyte liquid have substantially the same resistance, when the chamber is not tile. When the chamber inclines, areas of the electrodes immersed in the liquid vary relatively, such that differences in resistance of the two electrodes are generated. A reading circuit converts the variation of the tilt angle into electrical signals, whereby the tilt angle is known. The liquid inclinometer is simple in structure and fast in reaction but in fabricating the inclinometer, an additional sealing step of the chamber is required.

Most inclinometers are fabricated in two parts. The sensor part is fabricated in an MEMS (microelectromechanical system) process and the reading circuit is fabricated in a CMOS (complementary metal-oxide semiconductor) process. The two-part fabrication process is not only costly but also makes further condensation of the inclinometer difficult or impossible. A single-step MEMS process enables the design flexibility of the microstructure. Yet there is no standardized MEMS process that provides both flexibility in design and compatibility with necessary circuits at the same time.

Taiwan Patent No. 522221 discloses an inclinometer that comprises a printed circuit board and a pair of differential electrodes electrically independent from each other. The pair of differential electrodes and a common electrode are enclosed in a sealed chamber and the sealed chamber is filled with dielectric liquid. When the inclinometer tilts, areas of differential electrodes that are immersed in the dielectric liquid vary, resulted in variations in the capacitance generated by each differential electrode and the common electrode. The capacitance of each differential electrode is measured to calculate the tilt angle. Such inclinometer is not fabricated in the MEMS process, therefore is bulky.

Japan published patent application JP 2008-261695 discloses a micro inclinometer that uses the same theory of the TW 522221 and has a structure similar to that of the TW 522221, while the liquid filled in the chamber is a conductive liquid. The micro inclinometer is fabricated using the MEMS process, therefore has a microstructure. However, the structure disclosed in JP 2008-261695 is not suitable for the standard CMOS process. Therefore, its production cost is relatively high. In addition, its differential electrodes are semicircular in shape, whereby its sensing accuracy is limited; the inclinometer so prepared is not for sophisticate applications. Nevertheless, the sensor and the reading circuit are prepared separately, making their integration difficult.

OBJECTIVES OF THE INVENTION

The objective of this invention is to provide a novel structure of the liquid capacitive micro inclinometer.

Another objective of this invention is to provide a liquid capacitive micro inclinometer that is capable of detecting tilt angles in a plurality of directions.

Another objective of this invention is to provide a liquid capacitive micro inclinometer with plural pairs of differential electrodes.

Another objective of this invention is to provide a liquid capacitive micro inclinometer that may be fabricated using the standard CMOS process.

Another objective of this invention is to provide a liquid capacitive micro inclinometer with integrated reading circuits.

Another objective of this invention is to provide a liquid capacitive micro inclinometer that has substantially no moveable element, while providing high precision in measurement.

Another objective is to provide a novel method for the preparation of a liquid capacitive micro inclinometer.

Another objective is to provide a method for preparation of a liquid capacitive micro inclinometer using the standard CMOS process, whereby the reading circuits are integrated with the microstructure.

Another objective is to provide a method for the preparation of a liquid capacitive micro inclinometer that detects tilt angles in a plurality of directions.

Another objective is to provide a method for the preparation of a liquid capacitive micro inclinometer that has plurality pairs of differential electrodes.

SUMMARY OF THE INVENTION

According to the present invention, a novel structure of the liquid capacitive micro inclinometer is provided and comprises: at least two pairs of differential electrodes, each pair having electrodes positioned in the same plane; at least one common electrode, with a part thereof positioned in said same plane; a sealed chamber enclosing said differential electrodes and said common electrode; and immersing liquid filled in said sealed chamber. Each of the differential electrode has the shape of a part of a circular plane, preferably a sector of a circular plane. One pair of the differential electrodes may be prepared in the plane where another pair is provided, with one electrode separated from another. If two pairs of differential electrodes are positioned in different planes, the two pairs may share one common electrode. It is also possible to provide more than one common electrode. For example, in each plane where a pair of differential electrode is prepared, one common electrode may be provided.

The inclinometer may further comprise a reading circuit to generate reading values of capacitance corresponding to each differential electrode. The reading values may be used to determine tilt angles of the inclinometer in one or more direction. A lubrication layer may further be provided in at least a partial surface of the differential electrodes and/or the common electrode. The common electrode may be provided adjacent to the differential electrodes. The differential electrodes may comprise a plurality of notch at their edge, whereby the common electrode may comprise a plurality of extruder extended into said plurality of notch. If the shape of the differential electrodes is a sector circular plane, the notches may extend to over half radius of the circular plane. The immersing liquid may be conductive or dielectric. The plural pairs of differential electrodes and the common electrode may be formed on one silicon substrate. The reading circuit may also be formed on the same silicon substrate of the differential electrodes and the common electrode. The plural pairs of differential electrodes and the common electrode may be formed on a dielectric layer provided on a silicon substrate. The shape and area of each pair of the differential electrodes may be identical or different.

The present invention also provides a method for preparation of liquid capacitive micro inclinometers. The invented method comprises the steps of:

preparing a first substrate;

forming on the first substrate a stack of a plurality of metal layers and a plurality of dielectric layers; said stack comprising a pattern including at least two pairs of differential electrodes and at least one common electrode, wherein shape of the differential electrodes forms part of a circular plane and wherein electrodes belonging to a pair are in similar shape and have substantially the same area;

releasing the at least two differential electrodes and the at least one common electrode;

preparing a second substrate;

forming a material layer on the second substrate;

forming a recess in the material layer;

adding immersing liquid in the recess;

flipping the first substrate on the second substrate, so that the differential electrodes and the common electrode are positioned in a space defined by the recess; and combining the first substrate and the second substrate.

In some embodiments the shape of the differential electrodes preferably form sector of a circular plane. One pair of the differential electrode may be prepared in a layer of the stack other than the layer where another pair is prepared. Differential electrodes belonging to one pair may have the shape identical to or different from that belonging to another pair.

The first substrate may be a silicon substrate, while the second substrate may be a glass or plastic substrate. The common electrode may be provided adjacent to the differential electrodes. Notches may be provided at the edge of the differential electrodes, while extruders may be provided in the common electrode, so that the extruders extend into respectively corresponding notches. If the shape of the differential electrodes is a sector circular plane, the notches may extend to over half the radius of the circular plane. The immersing liquid may be conductive or dielectric.

The differential electrodes and the common electrode may be formed on a material layer provided on the first substrate. In such a case, the invented method further comprises a step of forming a material layer on the first substrate after the first substrate is prepared. The material layer may include at least one dielectric layer. The material layer may further comprise at least one metal layer and one additional dielectric layer.

The invented method may include a step of forming a reading circuit, when the differential electrodes and the common electrode are formed. The method may also include a step of forming a reading circuit, when the differential electrodes, the common electrode and the material layer are formed. The method may further include a step of applying a lubrication layer on least a partial surface of the differential electrodes and the common electrode, after the differential electrodes and the common electrode are released.

The material layer formed on the second substrate may be photoresist, therefore, the step of forming the recession may include a step of removing a part of the material layer. The step of releasing the differential electrodes and the common electrode may include a step of etching, to remove parts of the stack other than the parts forming the pattern of the differential electrodes and the common electrode.

BRIEF DESCRIPTION OF THE DRAWINGS

These and other objectives and advantages of this invention will be clearly appreciated from the following detailed description by referring to the following drawings.

FIGS. 4a and 4b illustrate the detection theory of the invented liquid capacitive micro inclinometer, when detecting tilt angles in one direction.

FIGS. 5a and 5b illustrate the detection theory of the invented liquid capacitive micro inclinometer, when detecting tilt angles in another direction.

DETAILED DESCRIPTION OF THE INVENTION

In the followings detailed description of the invented liquid capacitive micro inclinometer and its preparation method will be given by referring to its preferred embodiments. It is appreciated that description to the preferred embodiments serves to illustrate examples of the present invention, without limitation to its scope of protection.

Figure 1:
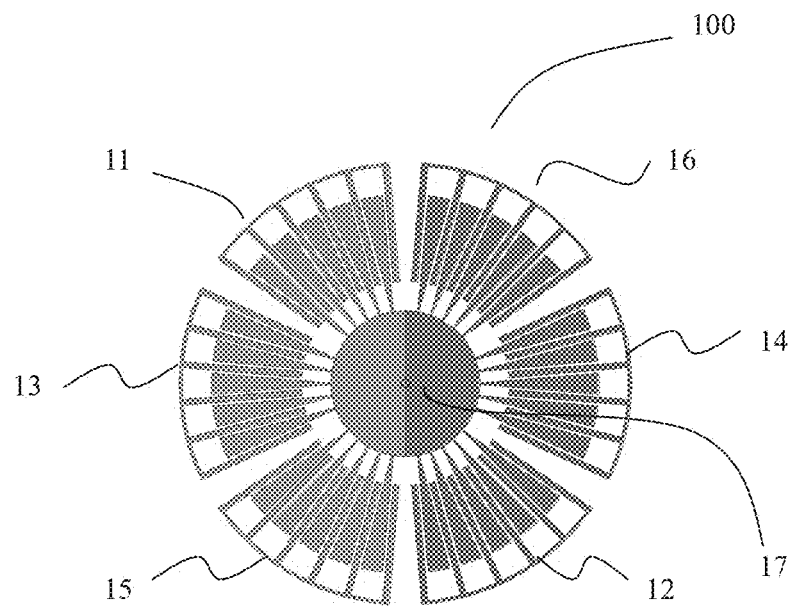
FIG. 1 illustrates the structure of a liquid capacitive micro inclinometer according to a first embodiment of this invention.

FIG. 1 illustrates the structure of a liquid capacitive micro inclinometer according to the first embodiment of this invention. The embodiment shown in this figure is an inclinometer 100 that includes 6 differential electrodes, 11, 12, 13, 14, 15 and 16, all formed in substantially the same plane. 17 is common electrode that forms a capacitor in combination with each differential electrode 11-16. In the structure shown in FIG. 1, differential electrodes 11 and 12 form a pair, 13 and 14 form another and 15 and 16 form the third.

Figure 2:
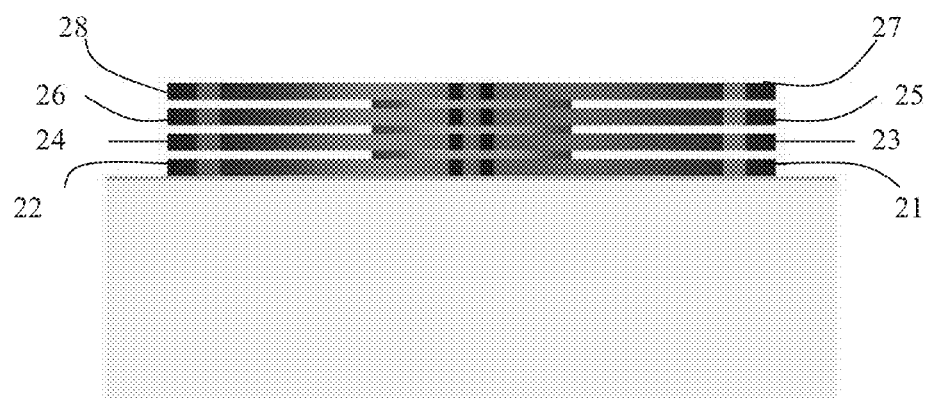
FIG. 2 shows the structure of a liquid capacitive micro inclinometer according to a second embodiment of this invention.

FIG. 2 shows the structure of a liquid capacitive micro inclinometer according to the second embodiment of this invention. The inclinometer 100 shown in this figure includes 4 pairs of differential electrodes 21 and 22, 23 and 24, 25 and 26, 27 and 28, each formed in one of the 4 parallel planes of the structure. In one plane one or more pair of differential electrodes may be formed. If more than one pair is formed in one plane, the plane may have the structure as shown in FIG. 1. In such a structure, the liquid capacitive micro inclinometer will include 12 pairs of differential electrodes. All differential electrodes may work with one or more common electrode, respectively.

In the preferred embodiments of this invention, the liquid capacitive micro inclinometer has a two-layer structure, with each layer being provided with two pairs of differential electrodes. Therefore, totally 4 capacitors are provided in one liquid capacitive micro inclinometer. Such a structure is easy to fabricate, is inexpensive in cost and is able to provide detection of tilt angles in a plurality of directions. Of course, it is possible to prepare an inclinometer with more or less than two layers, with more or less than two pairs of differential electrodes in one layer.

FIG. 2 also shows all the differential electrodes are prepared in a first substrate 10. The substrate 10 shown in FIG. 2 is a substrate used in the standard CMOS process, such as the silicon substrate. A plurality of alternative dielectric layer and metal layer and a plurality of via may be prepared on the substrate 10, using the standard CMOS process. In the stack of the dielectric layers, metal layers and vias, patterns of differential electrodes and common electrode consisted of metal layers or metal layers and dielectric layers are formed. The patterns are then released by, for example, wet etching, to obtain the required electrodes.

In the example shown in FIG. 2, totally 4 layers of electrode are formed on the substrate 10. However, in some preferred embodiments of this invention, the first metal layer is not used. In such embodiments, the lowest metal layer 21, 22 does not exist and the lowest layer of electrodes is formed in the second metal layer 23, 24 or above. Electrodes of a layer are spaced from electrodes of an adjacent layer by a dielectric layer or dielectric and metal layers, which are removed when releasing the electrodes. The common electrode may include a plurality of metal layers and a plurality of dielectric layers. Each differential electrode layer may also include a plurality of metal layers and a plurality of dielectric layers. Therefore, these electrode layers are defined by vias and are protected by vias, when they are released in an etching process.

Figure 3:
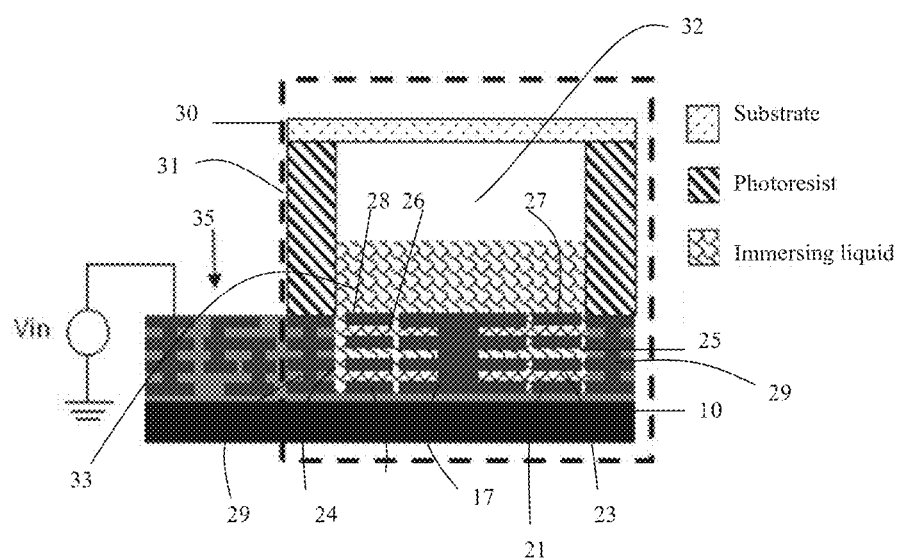
FIG. 3 shows the general structure of the liquid capacitive micro inclinometer of this invention.

FIG. 3 shows the general structure of the liquid capacitive micro inclinometer of this invention. In this figure, an electrode assembly with 4 layers is shown. A support structure 29 surrounding the differential electrodes 21-28 and the common electrode 17 and formed by a plurality of dielectric layers, a plurality of metal layers and a plurality of vias, is also shown. Partition walls 31 that define a space 32 above the electrode assembly 21-28 and 17 are formed on the support structure 29. A top plate, i.e., the second substrate 30 is adhered on the partition walls 31, whereby the space 32 defined by the partition walls 31 is sealed in the second substrate 30, the partition walls 31, the support structure 29 and the first substrate 10, making the space 32 a sealed chamber. The immersing liquid 33 and the electrode assembly 21-28 and 17 are sealed in the sealed chamber 32.

In the preferred embodiments of this invention, the partition walls 31 is made from photoresist materials and the second substrate 30 is a glass substrate. This, however, is not any technical limitation; other materials may be used to prepare the partition walls and the second substrate.

Parasite capacitance generated by the differential electrodes and the substrate may be reduced, if the differential electrodes 21-28 are prepared in the second metal layer or above. Of course, the differential electrodes 21-28 may be prepared to include any of the metal layers. If the electrodes are not prepared in the first (lowest in FIGS. 2 and 3) metal layer, material layer(s) would exist between the electrodes and the substrate 10, before they are released. Such material layer(s) may be removed or remain after the electrodes are released. In addition, the common electrode 17 preferably share a metal layer with each pair of the differential electrodes 21-28. Of course, this is not compulsory.

In order to reduce the capillary action that adheres the immersing liquid onto the surface of the differential electrodes 21-28 and the common electrode 17, a lubrication layer (not shown) may be applied to the full surface, or selected regions thereof, of the electrodes. Material for the lubrication layer may be any known material, such as Teflon. Any method may be used to combine the first substrate 10 and the second substrate 30, by aligning them with the assistance of any suitable tool. If adhesive is used, material of the adhesive may be any that is compatible with the partition walls 31 and the metal layers or the dielectric layers. It is also possible to fix the second substrate 30 to the first substrate 10 with pressure or heating, whereby an interface layer (not shown) between them will be formed.

Refer to FIG. 1, in which each of the differential electrode 11-16 forms sector of a circular plane. A plurality of notches is formed in each differential electrode, extending from the internal edge (the edge facing the common electrode) of the differential electrode. At the same time, the common electrode 17 has a main body formed in the central region of the differential electrodes 11-16 and a plurality of extruders extending into the notches of the differential electrodes 11-16. The structure including the differential electrodes 11-16 and the common electrode 17 is equivalent to an "interdigital capacitor." In the example of FIG. 1, each pair of the differential electrodes 11-16 is distributed in the opposite semicircular of the circular plane formed by all the differential electrodes, whereby range of detection is extended to ±90°. Of course, in most applications range of detection is not necessarily as wide as ±90°. Therefore, the total area of differential electrodes of a polarity occupies only part of a semi-circular plane, such as sector of an angle from 45° to 90°. In addition, differential electrodes of a pair preferably have identical or similar shape and substantially identical regional area and they are preferably positioned at opposite sides from the center of the circular plane defined by the differential electrodes. Such arrangements ensure preciseness in tilt angle detection.

In other embodiments of this invention, the shape of the differential electrodes 11-16 does not form part of a circle. Any arrangement that forms differential electrodes of a pair in substantially corresponding shapes, without impacting the precision of their detection, would be acceptable. Suitable shapes include equilateral triangle, isosceles triangle, isosceles polygon etc.

As shown in FIG. 1, the notches formed in the differential electrodes 11-16 extend deep into internal of the electrodes, i.e., over half-length of them. To be precise, when the shape of the differential electrodes 11-16 is sector of a circular plane, the notches extend to over half of the radius of an imaginative circle derined by the differential electrodes 11-16. At the same time, the extruders of the common electrode 17 extend deep into the notches, reaching at over half of the abovementioned radius. The structure of the invented electrode assembly produces greater capacitance and provides enhanced sensitivity in tilt angle detection, therefore is useful in detections where higher precision or resolution is needed.

Now refer to FIG. 2, wherein a multiple layered structure is shown. The design in FIG. 2 provides differential electrodes in a plurality of layers, whereby variations in capacitance detected from the respective differential electrodes may be expressed in a matrix. As a result, slight variations in tilt angle may be detected in a simplified way. In other words, slight variations in tile angle may be detected, without the need of enhancing detection resolutions in the capacitance.

The inclinometer of the present invention as described above may be fabricated in the standard CMOS process. The microstructure of the inclinometer may be fabricated on the same substrate of its reading circuits in the same process. The invented inclinometer does not only reduce its fabrication costs but also provide solutions in the integration of the tilt angle detector and the reading circuits.

FIGS. 4a and 4b illustrate the detection theory of the invented liquid capacitive micro inclinometer, when detecting tilt angles in a first direction. In FIG. 3, Vin is the input voltage and 35 is the reading circuit. The detector shown in FIG. 3 is equivalent to 24 pairs of differential electrodes, distributed in 4 layers. The relative position of the immersing liquid 33 and the differential electrodes 11-16 changes, when the tilt angle of the inclinometer varies. When this happens, areas of the related differential electrodes immersed in the immersing liquid varies relatively, whereby capacitance represented by the respective differential electrodes varies accordingly. The capacitance variations are read out by the reading circuit 30 and the results are output in the form of voltage signals. In FIG. 4a, the inclinometer is in its initial status, wherein the second pair of differential electrodes 13, 14 has the same area immersed in the immersing liquid 33. In this initial status, capacitance represented by the second pair is substantially the same, or may be defined as identical. On the other hand, the first pair 11, 12 and the third pair 15, 16 are the combination of a pair of fully immersed electrode and a pair of electrode free from the immersing liquid.

When the inclinometer tilts in a first direction as shown in FIG. 4b, the immersing liquid remains its position due to the gravity, while the area of the differential electrodes immersed in the liquid varies, which makes capacitance represented by the respective differential electrode varied accordingly. According to this invention, the variation of the capacitance is in a linear relation with the tilt angle of the inclinometer. Tilt angles in the first direction may thus be measured by calculating difference in capacitance represented by the respective electrodes.

FIGS. 5a and 5b illustrate the detection theory of the invented liquid capacitive micro inclinometer, when detecting tilt angles in a second direction. In the initial status shown in FIG. 5a, area in each layer of differential electrode immersed in the immersing liquid 33 is substantially the same. When the inclinometer tilts in the second direction, area in respective layers of differential electrode immersed in the liquid 33 varies as is shown in FIG. 5b. This changes capacitance represented by the respective differential electrodes. The reading values of the respective capacitance are then expressed in a matrix. The vectors obtained in the capacitance matrix represent tilt angles of the inclinometer in the first and second directions.

Figure 6:
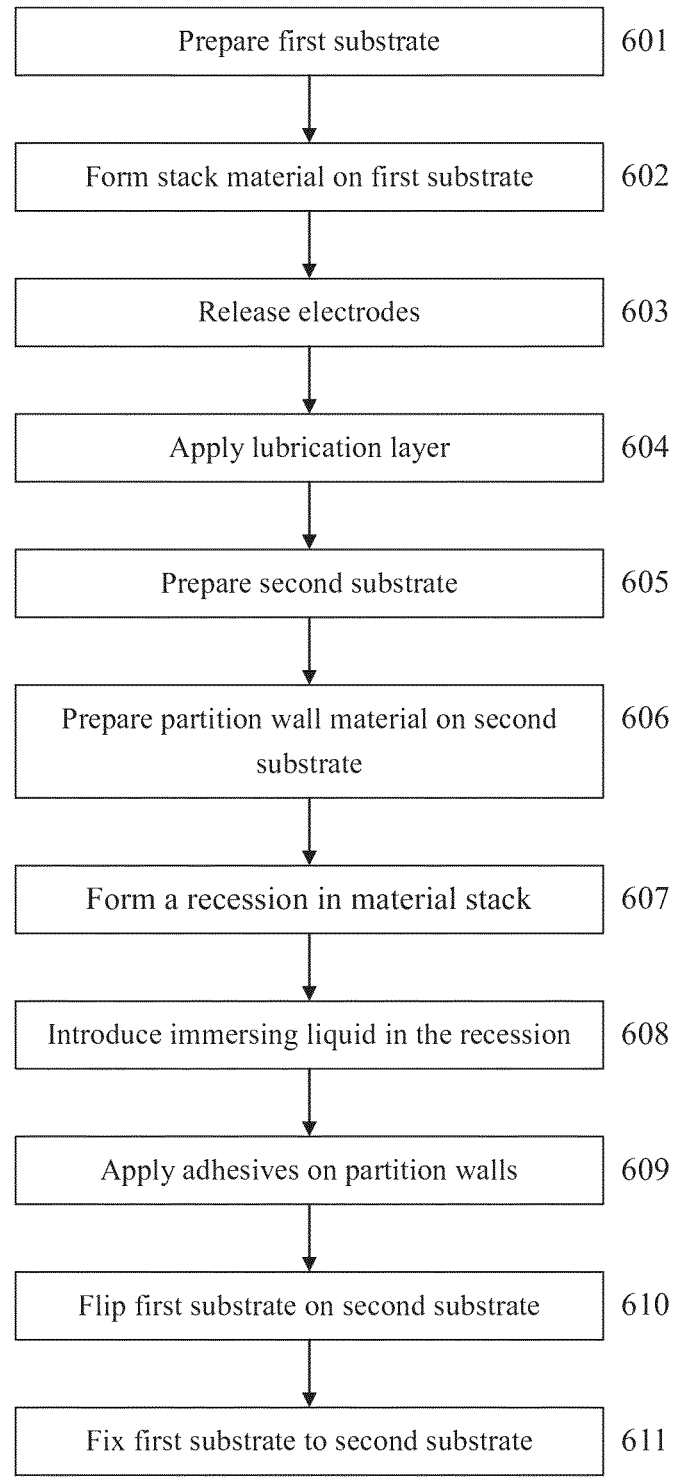
FIG. 6 shows the flowchart of the method for fabrication of the invented liquid capacitive micro inclinometer of this invention.
Figure 7A:
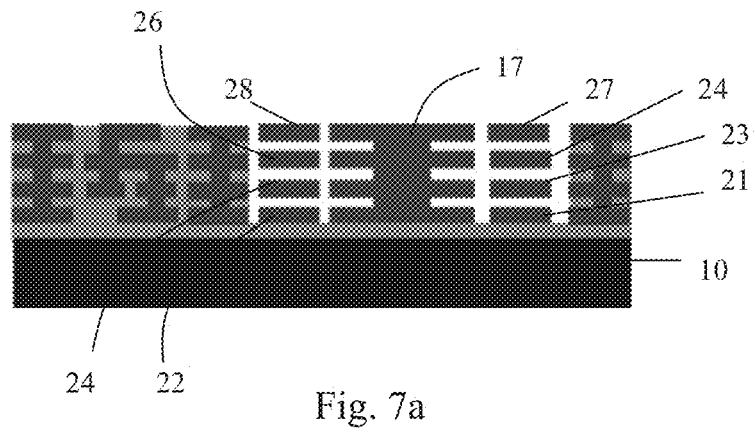
FIGS. 7a to 7c illustrate certain steps of the fabrication method of FIG. 6.
Figure 7B:
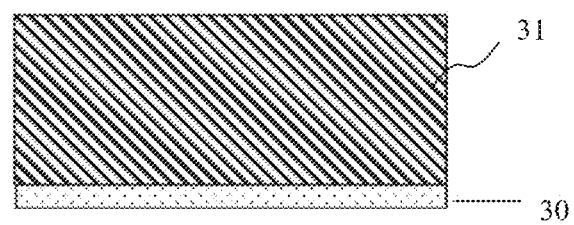
Figure 7C:
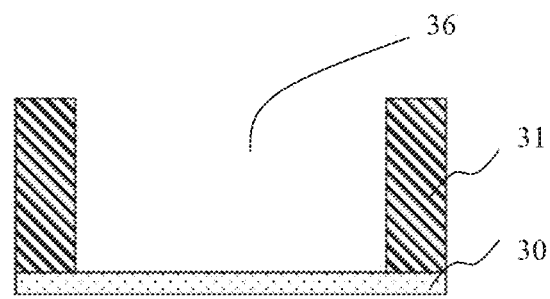

In the followings, method for fabrication of the invented liquid capacitive micro inclinometer will be described by illustrating the preferred embodiments. FIG. 6 shows the flowchart of the method for fabrication of the invented liquid capacitive micro inclinometer, while FIGS. 7a to 7c illustrate certain steps of the fabrication method. As shown in FIG. 6, in the preparation of the liquid capacitive micro inclinometer of this invention, at step 601, a first substrate 10 is prepared. The material of the first substrate 10 is not limited to any particular material. However, the substrate used in the standard CMOS process, i.e., the silicon substrate is preferable, because this helps in fabricating the invented inclinometer in the standard CMOS process. Other rigid materials or any material suited in the CMOS process may also be used in preparing the first substrate 10. In the following, at step 602 a stack of material is formed on the first substrate 10. The stack may include: a first dielectric layer on the first substrate 10, alternating layers of metal and dielectric on the first dielectric layer and vias in these layers. These material layers form a stack structure, with patterns of the detector and the reading circuit 35 formed therein. Methods suited in the preparation of the stack structure include any commercially available process in the preparation of circuit structure and/or microstructure. Among them, the standard CMOS process is preferable.

The reading circuit 35 may be any circuit structure obtained from any commercially available electronic design automation tool. For those having ordinary skills in the art, it is obvious to design the reading circuit and produce the circuit on the first substrate 10. Details thereof are thus omitted.

As to the preparation of the detector, in this particular example the differential electrodes and the common electrode are formed in two separate metal layers, such as in the third and fifth metal layers. Method for preparation of the electrode assembly includes, following the preparation of particular metal layers, forming patterns of the differential electrodes and the common electrode using, for example, wet etching, forming dielectric layer by and on the electrode patterns and repeating these steps until the stack structure is completed. In these steps, differential electrodes belonging to a pair have substantial the same or corresponding shapes and substantially identical regional area. The common electrode 17 is formed in the inner peripheral of the differential electrodes 11-16. Notches are formed in the differential electrodes 11-16 from their edge facing the common electrode 17. The common electrode 17 further includes extruders extending into the notches. Patterns of the electrodes having these and other features are formed in the stack structure using the conventional art. In addition, it is also possible to use the conventional art to form a plurality of differential electrodes in one plane or in substantially one plane. For those having ordinary skills in the art, it is easy to prepare the invented electrode patterns in the stack structure by reading the disclosure and the drawings of this invention. Details thereof are thus omitted.

In other embodiments, the electrodes 21-28 (FIG. 7a) include more than one metal layer, as well as dielectric layers between metal layers. If necessary, the electrodes 21-28 may further include vias. Materials suited for the metal layers, the dielectric layers and the vias are not limited to particular materials. Suited materials are known to those having ordinary skills in the art. Generally speaking, the metal layers may be aluminum, the dielectric layers may be silicon dioxide and the vias may be copper.

Following that, at step 603 dielectric material or dielectric material and metal material other than that forming the electrodes 21-28 and 17 are removed, until the electrodes 21-28 and 17 are released. The result is shown in FIG. 7a. At step 604 a lubrication layer (not shown) is applied on the electrodes 21-28 and 17. Material for the lubrication layer may be any that substantially eliminates or reduces the capillary action of the electrodes at their surface. In the preferred embodiments of this invention, the lubrication layer is a Teflon layer, while other materials that provide identical or similar effects may also be used. Method for applying the lubrication layer is not limited, while in some preferred embodiments the lubrication layer is applied by coating. Thickness of the lubrication layer is not a technical limitation but should be in a range that won't impact the preciseness of the inclinometer.

In the following, at step 605 a second substrate 30 is prepared. Material for the second substrate 30 is not limited but is preferably a material that is rigid and easy to process. In the preferred embodiments of this invention, the second substrate 30 is a glass substrate, while in other embodiments the second substrate 30 may be plastic, resin, glass fiber, metal, ceramic or a composite material. At step 606 a material layer for the partition walls 31 is prepared on the second substrate 30. Again, material for the partition walls is not limited to any particular material, while in the preferred embodiments this material layer 31 is a photoresist layer, so to simplify the process. Suitable photoresist material for the partition walls includes SU-8 and other photoresist materials. The partition wall material 31 may be formed on the second substrate 30 using any suited method. Although thickness of the partition wall layer 31 is not a technical limitation, the partition wall layer 31 is preferably in a thickness sufficient to create a space defined in the partition walls with sufficient volume to accommodate the immersing liquid. In the preferred embodiments, the thickness of the partition wall layer 31 is preferably between 100 and 2,000 um, more preferably between 200 and 1,000 um. The material layer so obtained is shown in FIG. 7b. At step 607 a recession 36 is formed in the material layer 31, to serve as a chamber to hold the immersing liquid. The recession 36 may be formed using any suitable method, such as removing parts of the partition wall layer 31 by e.g. wet etching. Other methods such as laser etching are also applicable. If necessary, cutting lines (not shown) may be formed at edges of each unit of the partition walls. The material layers so obtained includes the second substrate 30, a recession 36 and its partition walls 31, as shown in FIG. 7c.

Later, at step 608 immersing liquid 33 is added in the recession 36. The immersing liquid 33 may be a conductive or non-conductive liquid. If the liquid 33 is conductive, it may be an electrolyte liquid, a magnetic liquid, a liquid metal or a liquid containing nano metal particles. If the liquid 33 is not conductive, it may be a liquid of a higher proportion and a lower viscosity, such as silicone oil. Volume of the immersing liquid being introduced into the recession 36 is not a technical limitation. In some preferred embodiments, volume of the immersing liquid 33 is approximately half that of the chamber defined by the partition walls 31. At step 609 adhesives are applied in the open edges of the partition walls 31. At step 610 the assembly of the first substrate 10 is flipped on the second substrate 30, such that the plurality of differential electrodes 21-28 and the common electrode 17 are contained in the recession 36 and the support structure 29 of the first substrate 10 presses against the open edges of the partition walls 31. At step 611 the first substrate 10 is affixed to the second substrate 30, with any suitable method that cures the adhesives and firmly affixes the two assemblies. A plurality of inclinometer is thus obtained. In the following, units of the inclinometer are separated at the cutting lines to obtain the invented inclinometer. The structure of the obtained inclinometers is shown in FIG. 3.

The multilayered liquid capacitive micro inclinometer of this invention has a novel and simple structure. It is easy to fabricate and is compatible with the standard CMOS process. Its reading circuit may be fabricated at the same time when the inclinometer is fabricated, so that the two parts are well integrated. The invented structure provides reduced fabrication costs and time. The invented micro inclinometer detects tilt angles in a plurality of directions, therefore is able to detect tilt angles in a three-dimensional space. The tilt angles are calculated using a matrix of measurement data, therefore requirements in precision of fabrication process are dramatically reduced. The invented inclinometer may be fabricated in small size. Experimental samples are in the size of approximately 2.3×3.1 mm, with or without the reading circuit. In addition, the invention provides the possibility of detecting tilt angles in the range of ±90°.

What is claimed is:

1. A liquid capacitive micro inclinometer, comprising: at least two pairs of differential electrodes, each pair having electrodes positioned in the same plane; at least one common electrode, with a part thereof positioned in said same plane; a sealed chamber enclosing said differential electrodes and said common electrode; and immersing liquid filled in said sealed chamber.

2. The liquid capacitive micro inclinometer of claim 1, wherein each of the differential electrode has a shape of a partial circular plane.

3. The liquid capacitive micro inclinometer of claim 2, wherein the differential electrode has a shape of a sector of a circular plane.

4. The liquid capacitive micro inclinometer of claim 1, wherein a pair of the differential electrodes is prepared in the plane where another pair is provided, with one electrode separated from another in a distance.

5. The liquid capacitive micro inclinometer of claim 1, further comprising a reading circuit to generate reading values of capacitance corresponding to each differential electrode.

6. The liquid capacitive micro inclinometer of claim 1, further comprising a lubrication layer on at least a part of the differential electrodes and the common electrode.

7. The liquid capacitive micro inclinometer of claim 1, wherein the common electrode is provided at internal edges of the differential electrodes.

8. The liquid capacitive micro inclinometer of claim 1, wherein the differential electrodes comprise a plurality of notch at their edge and the common electrode comprises a plurality of extruder extended into said plurality of notch.

9. The liquid capacitive micro inclinometer of claim 8, wherein the shape of the differential electrodes is a sector circular plane and the notches extend to over half radius of the circular plane.

10. The liquid capacitive micro inclinometer of claim 8, wherein the immersing liquid is one selected from the group consisted of a conductive liquid and a dielectric liquid.

11. The liquid capacitive micro inclinometer of claim 1, wherein the plural pairs of differential electrodes and the common electrode are formed on one silicon substrate.

12. The liquid capacitive micro inclinometer of claim 5, wherein the plural pairs of differential electrodes and the common electrode are formed on one silicon substrate and the reading circuit is formed on said silicon substrate.

13. The liquid capacitive micro inclinometer of claim 1, wherein the plural pairs of differential electrodes and the common electrode are formed on a dielectric layer provided on a silicon substrate.

14. The liquid capacitive micro inclinometer of claim 1, wherein the shape and area of each pair of the differential electrodes are identical.

15. A method for preparation of liquid capacitive micro inclinometers, comprising the steps of:

preparing a first substrate;

forming on the first substrate a stack of a plurality of metal layers and a plurality of dielectric layers; said stack comprising a pattern including at least two pairs of differential electrodes and at least one common electrode, wherein shape of the differential electrodes forms part of a circular plane and wherein electrodes belonging to a pair are in similar shape and have substantially the same area;

releasing the at least two differential electrodes and the at least one common electrode;

preparing a second substrate;

forming a material layer on the second substrate;

forming a recess in the material layer;

adding immersing liquid in the recess;

flipping the first substrate on the second substrate, so that the differential electrodes and the common electrode are positioned in a space defined by the recess; and combining the first substrate and the second substrate.

16. The method according to claim 15, wherein shape of the differential electrodes forms sector of a circular plane.

17. The method according to claim 15, wherein a pair of the differential electrode is prepared in a layer of the stack other than the layer where another pair is prepared.

18. The method according to claim 15, wherein differential electrodes belonging to one pair have a shape identical to that belonging to another pair.

19. The method according to claim 15, wherein the first substrate is a silicon substrate and the second substrate is a glass substrate.

20. The method according to claim 15, wherein the first substrate is a silicon substrate and the second substrate is a plastic substrate.

21. The method according to claim 15, further comprising the steps of providing notches at an edge of the differential electrodes and providing extruders in the common electrode, such that the extruders extend into respectively corresponding notches.

22. The method according to claim 21, wherein shape of the differential electrodes is a sector circular plane and the notches extend to over half the radius of the circular plane.

23. The method according to claim 15, wherein the immersing liquid is one selected from the group consisted of a conductive liquid and a dielectric liquid.

24. The method according to claim 15, wherein the differential electrodes and the common electrode are formed on a material layer provided on the first substrate and wherein the method further comprises a step of forming a material layer on the first substrate after the first substrate is prepared.

25. The method according to claim 24, wherein the material layer includes at least one dielectric layer.

26. The method according to claim 24, wherein the material layer further comprises at least one metal layer and one additional dielectric layer.

27. The method according to claim 15, further comprising a step of forming a reading circuit, when the differential electrodes and the common electrode are formed.

28. The method according to claim 24, further comprising a step of forming a reading circuit, when the differential electrodes and the common electrode are formed.

29. The method according to claim 15, further comprising a step of forming a reading circuit, when the differential electrodes, the common electrode and the material layer are formed.

30. The method according to claim 15, further comprising a step of applying a lubrication layer on least a partial surface of the differential electrodes and the common electrode, after the differential electrodes and the common electrode are released.

31. The method according to claim 15, wherein releasing the differential electrodes and the common electrode comprises a step of etching, to remove parts of the stack other than the parts forming the pattern of the differential electrodes and the common electrode.

* * * * *